Patented Aug. 14, 1934

1,969,998

UNITED STATES PATENT OFFICE 1,969,998

COMBINATION OF SALICYLIC ACID AND CALCIUM SALTS

Mark H. Wodlinger, Chicago, Ill., assignor to Cal-Aspirin Company, a corporation of Delaware No Drawing. Application December 9, 1932, Serial No. 646,494

1 Claim. (Cl. 167—68)

My invention relates to an improvement in the utilization of acetyl salicylic acid. The therapeutic properties of acetyl salicylic acid are well known and have been for many years. It has, however, some very undesirable properties or characteristics, which become particularly manifest in the case of large therapeutic dosages. Among the results of such dosages are gastric irritation, toxicity, and a toxic effect on the kidneys. There are other undesirable qualities which are somewhat less frequent, such as reactions which appear in individuals "sensitive" to acetyl salicylic acid.

One object of my invention is to obtain a compound which retains all the excellent and desired properties of acetyl salicylic acid, but which minimizes or does away with the undesired reactions frequently observed after the administration of the drug, of which the above mentioned are examples. Another object is the provision of a combination of acetyl salicylic acid and a calcium salt which shall be stable. Other objects will appear from time to time in the course of the specification and claims.

It is characteristic of my invention that I combine with acetyl salicylic acid a neutral salt of calcium. As an example I may indicate calcium gluconate. The admixture of the calcium has several advantages. For example, calcium plays an important role in the body metabolism, in the physiological function of the body, namely, in coagulation of the blood, in the contraction of the muscles, in bone development, and in improving or preventing pathological conditions such as rickets and thyroid dyscrasias. More important for my purpose is the specific effect of calcium on the action of the acetyl salicylic acid with which I combine it. I find that it lowers the toxicity of the acetyl salicylic acid. I also find, upon experimentation, that the calcium increases the permeability of the intestine, to certain drugs for example the iodides.

Specifically, I find that the combination of a neutral calcium salt, such as calcium gluconate, with the acetyl salicylic acid, substantially lowers its toxicity. It almost entirely prevents the observable gastric irritation, as compared to an equal dosage of acetyl salicylic acid alone. Calcium gluconate is particularly advantageous as being an organic compound rather than an inorganic compound such as calcium carbonate. I do not wish at this time to attempt to state positively why the calcium salt has this action. It is possible that the calcium may produce a relaxation of a pylorospasm, thereby decreasing the emptying time of the stomach and thus preventing retention and irritation not only by the acetyl salicylic acid but also the salicylic acid liberated upon hydrolysis. Again the calcium may act indirectly through the liver in exciting this protective action, or its effect may be reached in some other way. What is essential is that the protective effect does take place and that I have established it by careful and extended experiments upon animal subjects.

The protective effect of calcium on the kidney when given with acetyl salicylic acid is evident, as judged by the appearance of albuminuria as compared to the action of acetyl salicylic acid in equal dosage.

The calcium, such as calcium gluconate, may be combined with the acetyl salicylic acid in varying quantities, up to say 50 per cent or even more, of that of the acetyl salicylic acid. Such an admixture does not on experiment appear to detract at all from the therapeutic effectiveness of the acetyl salicylic acid, but does greatly add to its efficiency in the manners above indicated.

It will be understood, however, that I do not wish to be limited to any specific proportion. I have used with success tablets in which the calcium gluconate is 50 per cent in weight of the acetyl salicylic acid with which it is associated. While this is a practical proportion, none the less I may work with more or with less of the neutral calcium salt.

Calcium acetyl salicylate has been employed in the past for example in tablet form, but the practicability of such use has been diminished by the instability of such compound and by the relatively rapid deterioration of such compound in the form in which it has been put on the market. In particular, it is highly disadvantageous to employ these earlier calcium compounds in tablet form. The tablets very rapidly deteriorate or break down, with not merely a change in appearance and consistency in the tablet, but hydrolize into free salicylic acid and other products of hydrolysis. This diminishes the therapeutic efficiency as well as causing the tablets to be of such appearance as to be hardly salable if at all. When such compounds have been put up in tablet form the tablets have tended to hydrolize very rapidly in such fashion that they cannot be preserved either for sale or for use for any substantial period.

In order to overcome this instability, or rather to obtain a calcium combination which would be stable, I have combined the acetyl salicylic acid with a neutral salt of calcium. Specifically, I obtain the results above described by an addition of calcium gluconate to acetyl salicylic acid. The consequent combination of calcium with the salicylic acid is a stable compound which, when put up in tablet form, and given the ordinary care and kept in the ordinary containers, lasts indefinitely. In fact, so far as stability is concerned, the tablets in which calcium gluconate is employed have proved as stable as the commercial aspirin tablets and are therefore in startling contrast to the unstable tablets of the calcium salt of salicylic acid above referred to.

To summarize the results, the calcium gluconate lowers the toxicity of the acetyl salicylic acid, the dose at which albuminuria appears is markedly raised, and marked gastric irritation is in part or totally prevented by its administration with the calcium gluconate, and all this with a tablet which is as stable as the commercial aspirin tablets.

In the manufacture of the tablets I may merely add the neutral calcium salt, such as calcium gluconate, to the acetyl salicylic acid in dry form, mix them thoroughly, granulate the mixture and run it through any suitable tablet machine such as are well known in the art. If necessary I may add a binder and disintegrating agent such as potato starch in any suitable quantity.

In considering the prior art use of a calcium salt of acetyl salicylic acid it should be kept in mind that such a salt is unstable. I have avoided such instability by merely mixing a neutral calcium salt with the acetyl salicylic acid so that they are rather mechanically associated in a tablet than combined in a chemical compound. Therefore, there is no unstable calcium salt to hydrolize.

I find it practical to employ my product in tablet form but it may also be prepared and used as a powder or in a capsule.

I claim:

As a new composition of matter, acetyl salicylic acid, and calcium gluconate in substantially the proportion of one part calcium gluconate to two of acetyl salicylic acid.

MARK H. WODLINGER.